US009692795B2

(12) United States Patent
Chattopadhyay et al.

(10) Patent No.: US 9,692,795 B2
(45) Date of Patent: Jun. 27, 2017

(54) DYNAMIC GROUP AND EVENT UPDATE METHOD IN PHONE BASED IMPROMPTU MEET-UP APP

(75) Inventors: Biplab Chattopadhyay, San Diego, CA (US); Sanghamitra Bhattacharya, San Diego, CA (US); Bryant K. Forsgren, San Diego, CA (US); Sreeram Kanumuri, San Diego, CA (US); Simon Teplitsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 13/449,438

(22) Filed: Apr. 18, 2012

(65) Prior Publication Data

US 2013/0282833 A1 Oct. 24, 2013

(51) Int. Cl.

| | | |
|---|---|---|
| *G06F 15/16* | (2006.01) | |
| *H04L 29/06* | (2006.01) | |
| *H04L 12/58* | (2006.01) | |
| *H04W 4/02* | (2009.01) | |
| *H04L 12/18* | (2006.01) | |

(52) U.S. Cl.
CPC ........ *H04L 65/403* (2013.01); *H04L 12/1818* (2013.01); *H04L 51/32* (2013.01); *H04L 65/1069* (2013.01); *H04L 65/4038* (2013.01); *H04W 4/02* (2013.01)

(58) Field of Classification Search
CPC .... G06Q 30/02; G06Q 30/0631; G06Q 10/10; G06Q 30/0601; G06Q 30/0282; G06Q 50/01; G06Q 30/0253; G06Q 30/0255; G06Q 30/0201; G06Q 30/0251; G06Q 30/00; G06Q 30/0202; G06Q 30/0204; G06Q 30/0217; H04L 65/403; H04L 12/18; H04L 51/32; H04W 4/02
See application file for complete search history.

(56) References Cited

U.S. PATENT DOCUMENTS

| | | | | |
|---|---|---|---|---|
| 8,700,644 | B1 * | 4/2014 | Allen et al. | ................... 707/754 |
| 2004/0210451 | A1 * | 10/2004 | Bhan et al. | ...................... 705/1 |
| 2005/0165762 | A1 * | 7/2005 | Bishop | ............................. 707/3 |
| 2007/0244737 | A1 * | 10/2007 | Herrin | ............................... 705/9 |

(Continued)

FOREIGN PATENT DOCUMENTS

| | | |
|---|---|---|
| WO | 2004053848 A2 | 6/2004 |
| WO | 2008053467 A2 | 5/2008 |
| WO | 2008127343 A1 | 10/2008 |

OTHER PUBLICATIONS

International Search Report and Written Opinion—PCT/US2013/036931—ISA/EPO—Feb. 12, 2014.

(Continued)

*Primary Examiner* — Padma Mundur
(74) *Attorney, Agent, or Firm* — Raphael Freiwirth

(57) ABSTRACT

This disclosure relates to generating a group of invitees in a wireless communication system. An embodiment of the disclosure receives criteria for an event from an organizer of the event, compares the criteria to contact information of each contact of a plurality of contacts, assigns a recommendation ranking to each contact based on the comparison of the criteria to the contact information for each contact, and displays a subset of the plurality of contacts sorted according to the recommendation ranking.

32 Claims, 7 Drawing Sheets

(56) References Cited

U.S. PATENT DOCUMENTS

| | | | |
|---|---|---|---|
| 2007/0260684 A1* | 11/2007 | Sharma | G06Q 10/109 709/204 |
| 2008/0075255 A1* | 3/2008 | Nguyen et al. | 379/202.01 |
| 2008/0098087 A1* | 4/2008 | Lubeck | G06Q 10/00 709/218 |
| 2008/0147469 A1* | 6/2008 | Murillo et al. | 705/9 |
| 2008/0300944 A1* | 12/2008 | Surazski et al. | 705/8 |
| 2009/0094532 A1 | 4/2009 | Lyle et al. | |
| 2009/0258636 A1 | 10/2009 | Helvick | |
| 2009/0292550 A1 | 11/2009 | Ly | |
| 2009/0292783 A1 | 11/2009 | Burke | |
| 2010/0022225 A1* | 1/2010 | Benger et al. | 455/414.1 |
| 2010/0222033 A1* | 9/2010 | Scott et al. | 455/414.1 |
| 2011/0015961 A1* | 1/2011 | Chan | 705/9 |
| 2011/0184768 A1 | 7/2011 | Norton et al. | |
| 2011/0283218 A1* | 11/2011 | Schwendimann et al. | 715/772 |
| 2012/0016708 A1 | 1/2012 | Dheap et al. | |

OTHER PUBLICATIONS

Partial International Search Report—PCT/US2013/036931—ISA/EPO—Nov. 14, 2013.

* cited by examiner

DYNAMIC GROUP AND EVENT UPDATE METHOD IN PHONE BASED IMPROMPTU MEET-UP APP

FIELD OF DISCLOSURE

This disclosure relates to wireless communication systems, and in particular to creating a dynamic group of invitees for an impromptu event and updating the details of the event as necessary based on information about the respondents that accept the invitation.

BACKGROUND

There are many opportunities in daily life to setup impromptu meetings or events. For example, someone may wish to go out to dinner with a group of friends and/or family. Someone else may wish to invite a group of people to see a new movie opening weekend. Another person may have an extra football ticket and wish to notify his or her friends that it is available or for sale. An employee may wish to setup a meeting with coworkers to discuss a particular project.

In cell phone based impromptu event organization applications there are two prominent problem areas. First, the selection of the contacts or the creation of the group based on the type of event is often laborious and in some cases might threaten the "impromptu" nature of the event. Second, in many cases, based on the subset of the invitees who "accepted" and who "rejected" the event, the event itself may need some change in order to best fit the new set of attendees. It is often difficult for the event organizer to make such a change manually, or even to notice that this change is required.

What is needed is a way to create a dynamic group of invitees for an impromptu event and update the details of the event as necessary based on information about the respondents that accept the invitation.

SUMMARY

This disclosure relates to generating a group of invitees in a wireless communication system. An embodiment of the disclosure receives criteria for an event from an organizer of the event, compares the criteria to contact information of each contact of a plurality of contacts, assigns a recommendation ranking to each contact based on the comparison of the criteria to the contact information for each contact, and displays a subset of the plurality of contacts sorted according to the recommendation ranking.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
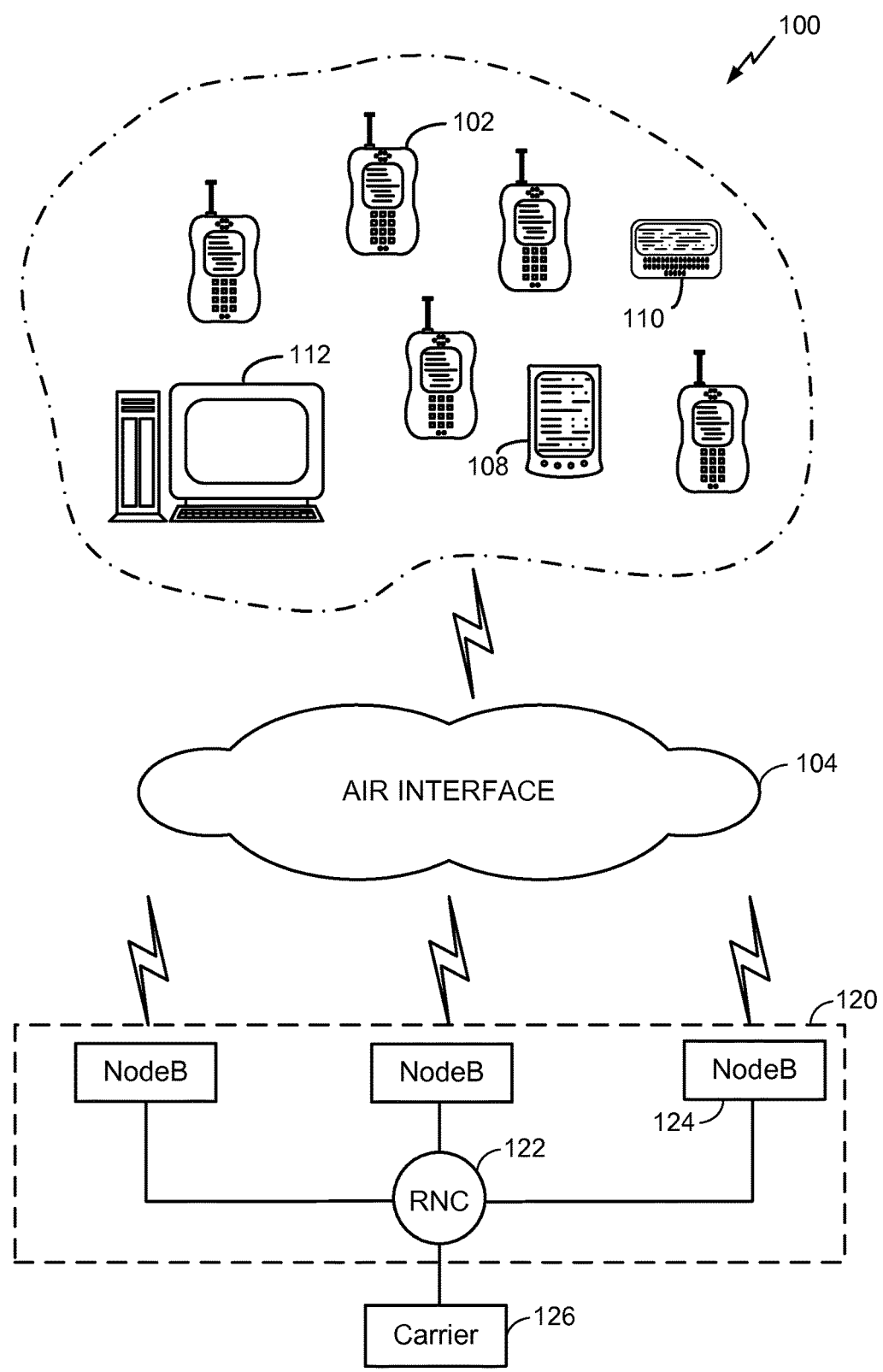
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the UE 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of UE including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal," "AT," "wireless device," "client device," "mobile terminal," "mobile station," and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2:
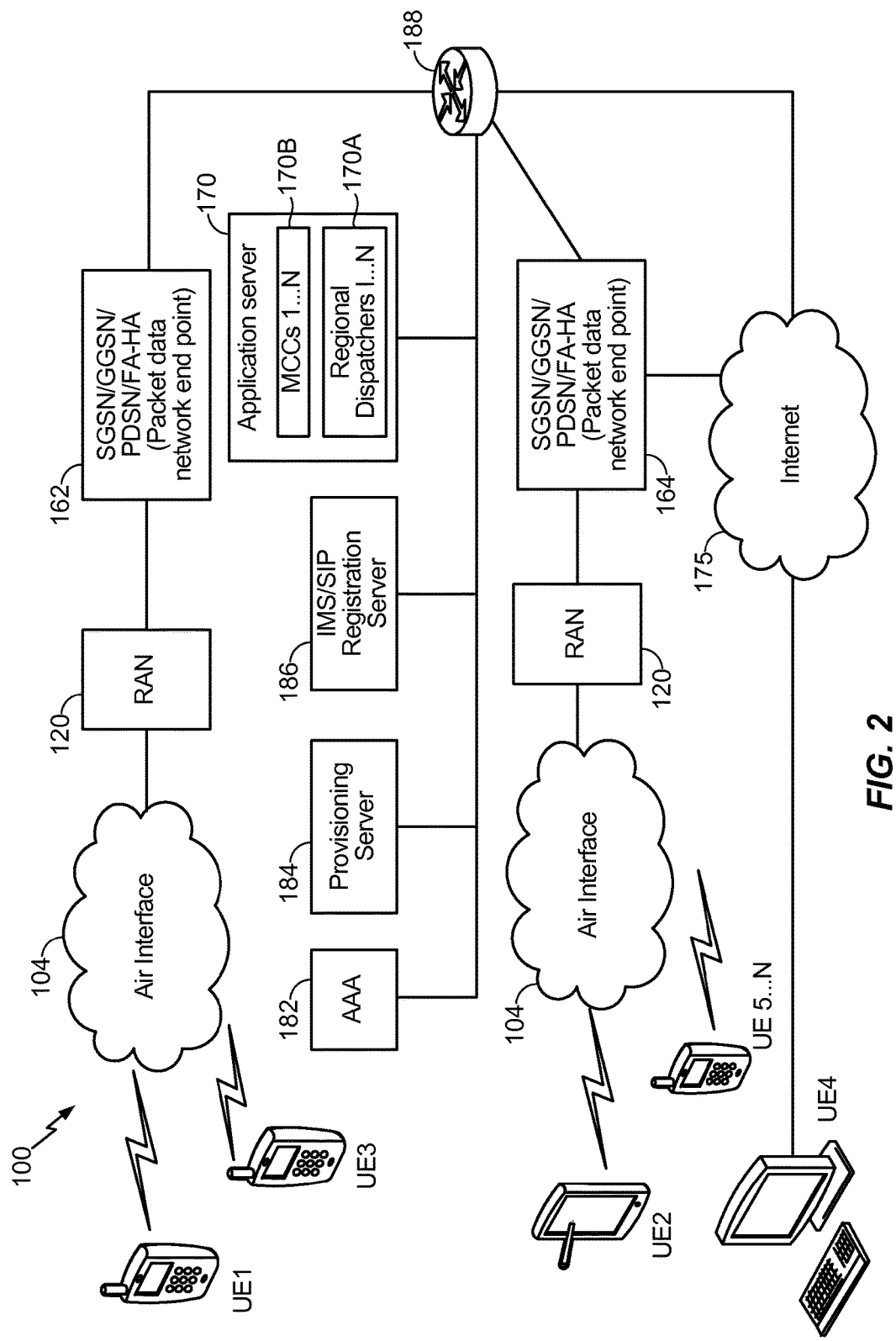
FIG. 2 illustrates an example of the wireless communications system of FIG. 1 in more detail.

FIG. 2 illustrates an example of the wireless communications system 100 of FIG. 1 in more detail. In particular, referring to FIG. 2, UEs 1 . . . N are shown as connecting to the RAN 120 at locations serviced by different packet data network end-points. The illustration of FIG. 2 is specific to W-CDMA systems and terminology, although it will be appreciated how FIG. 2 could be modified to conform with various other wireless communications protocols (e.g., LTE, EV-DO, UMTS, etc.) and the various embodiments are not limited to the illustrated system or elements.

UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2, UEs 1, 3 and 4 . . . N are illustrated as wireless cell-phones, UE 2 is illustrated as a wireless tablet- and/or laptop PC. However, in other embodiments, it will be appreciated that the wireless communication system 100 can connect to any type of UE, and the examples illustrated in FIG. 2 are not intended to limit the types of UEs that may be implemented within the system.

Figure 3:
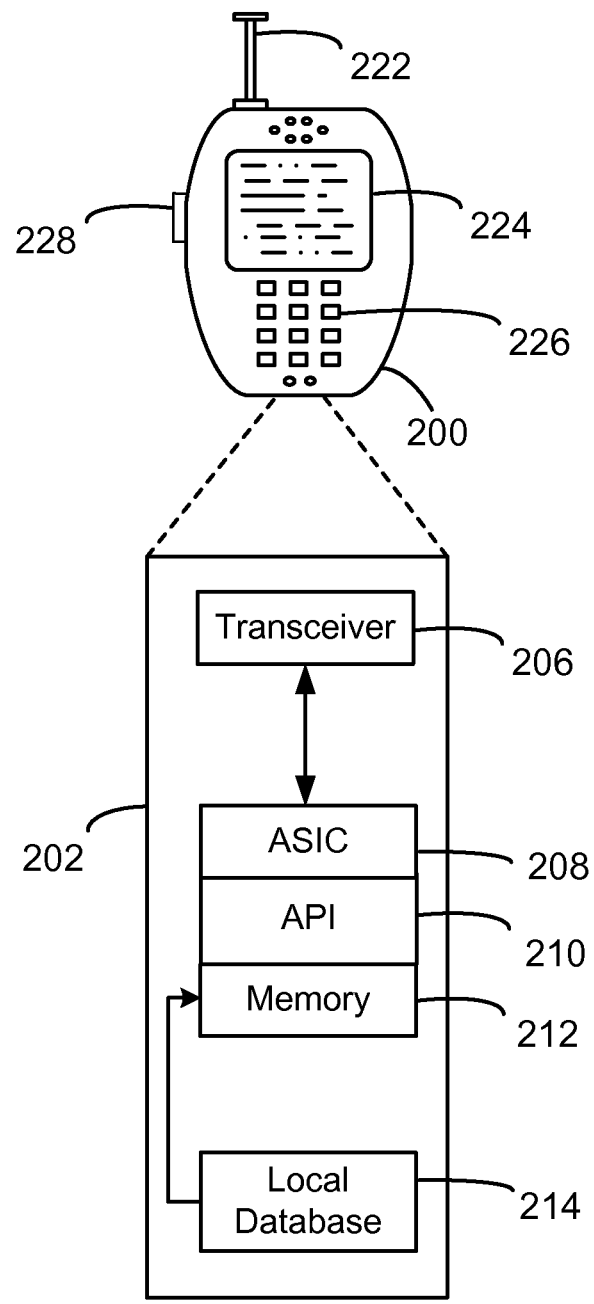
FIG. 3 illustrates a user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), 3GPP Long Term Evolution (LTE) or other protocols that may be used in a wireless communications network or a data communications network. Accordingly, the illustrations provided herein are not intended to limit the embodiments of the invention and are merely to aid in the description of aspects of embodiments of the invention.

Figure 4:
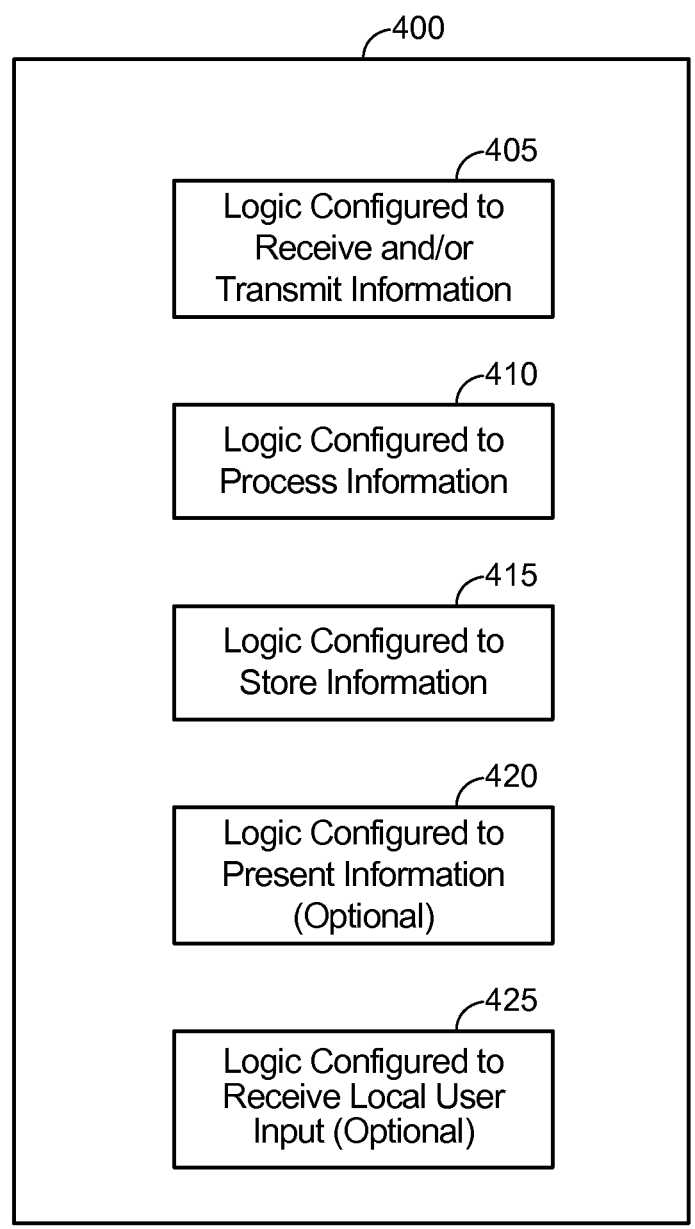
FIG. 4 illustrates a communication device that includes logic configured to perform functionality according to at least one embodiment of the invention.

FIG. 4 illustrates a communication device 400 that includes logic configured to perform functionality. The communication device 400 can correspond to any of the above-noted communication devices, including but not limited to UEs 102, 108, 110, 112 or 200, Node Bs or base stations 120, the RNC or base station controller 122, a packet data network end-point (e.g., SGSN 160, GGSN 165, a Mobility Management Entity (MME) in Long Term Evolution (LTE), etc.), any of the servers 170 through 186, etc. Thus, communication device 400 can correspond to any electronic device that is configured to communicate with (or facilitate communication with) one or more other entities over a network.

Referring to FIG. 4, the communication device 400 includes logic configured to receive and/or transmit information 405. In an example, if the communication device 400 corresponds to a wireless communications device (e.g., UE 200, Node B 124, etc.), the logic configured to receive and/or transmit information 405 can include a wireless communications interface (e.g., Bluetooth, WiFi, 2G, 3G, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., SGSN 160, GGSN 165, application server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to display information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 200 as shown in FIG. 3, the logic configured to present information 420 can include the display 224. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 200 as shown in FIG. 3, the logic configured to receive local user input 425 can include the display 224 (if implemented a touch-screen), keypad 226, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

There are many opportunities in daily life to setup impromptu meetings or events. For example, someone may wish to go out to dinner with a group of friends and/or family. Someone else may wish to invite a group of people to see a new movie opening weekend. Another person may have an extra football ticket and wish to notify his or her friends that it is available or for sale. An employee may wish to setup a meeting with coworkers to discuss a particular project.

In cell phone based impromptu event organization applications there are two prominent problem areas. First, the selection of the contacts or the creation of the group based on the type of event is often laborious and in some cases might threaten the "impromptu" nature of the event. Second, in many cases, based on the subset of the invitees who "accepted" and who "rejected" the event, the event itself may need some change in order to best fit the new set of attendees. It is often difficult for the event organizer to make such a change manually, or even to notice that this change is required or desired.

The disclosure relates to creating a dynamic group of invitees for an impromptu event and updating the details of the event as necessary based on information about the respondents that accept the invitation.

Figure 5:
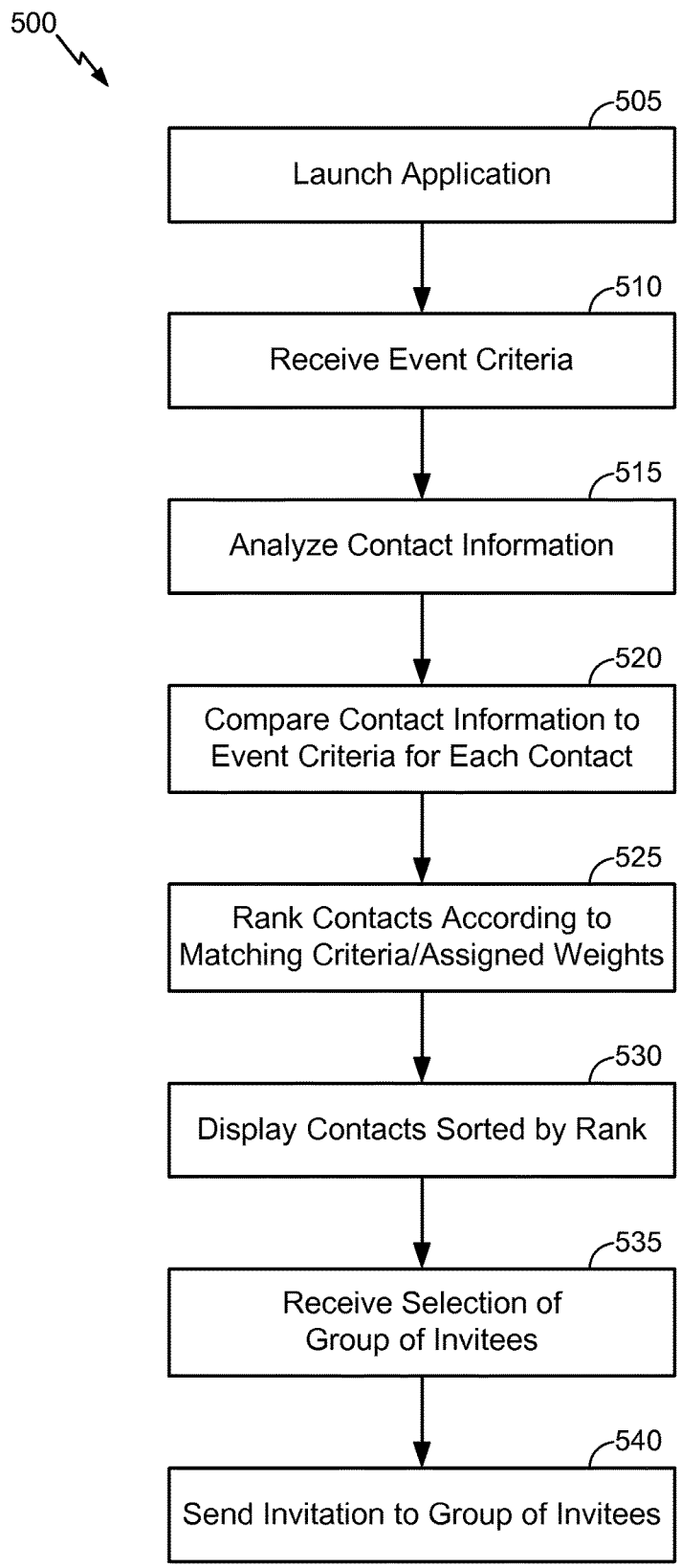
FIG. 5 illustrates an exemplary flowchart according to at least one embodiment of the invention.

FIG. 5 illustrates a flowchart 500 according to an embodiment of the invention, whereby an application (a.k.a. an "app") installed on a cell phone or other wireless device, such as UEs 102, 108, 110, 112, or 200, enables an organizer to create a dynamic group of invitees based on an event description. Although the aspects of FIG. 5 are described as if performed by the application, it is understood that the wireless device is actually performing the acts by executing the application. When the organizer wishes to create an event, he or she launches the application, 505. At 510, the organizer enters event criteria, such as category (e.g., a movie, dinner, etc.), name, time, location, type, purpose, minimum number of invitees, maximum number of invitees, category of invitee, strength of the criteria (i.e. how strongly the organizer feels about a particular criteria), etc. The organizer may also specify a "freeze" time, which may be a time by which the invitees must respond to the invitation, a threshold number of invitees that must respond, a threshold number of invitees that must accept, a threshold number of invitees that must accept or conditionally accept, etc. For example, the organizer could specify a freeze time of 4:00 pm or a threshold number of six invitees that must at least conditionally accept, whichever comes first.

At 515, the application analyzes each of the organizer's contacts for their present information, history information, and user preferences. A contact's present information includes their location, age, gender, relationship, profession, calendar status, etc. A contact's history includes information such as the number of times the organizer invited this contact to similar events, the number of times the organizer chose not to invite the contact when presented with that contact as a prospective invitee, the number of times the contact accepted the invitation, the number of times the contact has been to that location, the number of times the organizer has called or messaged the contact, etc. A contact's preferences include such things as the type of food or movies that person likes, whether the contact is a vegetarian, the contact's favorite sports team(s), the contact's favorite type of movies, the contact's preferred means of contact, etc. A contact's preferences may be stored on their wireless device or at a social networking site, or obtained from their Internet search history or conversation history with the organizer. Conversation history may include text messages, social networking posts, blog posts, microblog posts, etc. received at the organizer's wireless device.

At 520, the application compares each contact's information to the event criteria to determine which contacts match the criteria. This may be done by, for example, searching the contact's preferences, history, and present information for keywords matching the event criteria, determining the contact's distance from the event location, etc. For example, if the event is dinner (category of event) at the Mira Mesa (location) Olive Garden (name) Italian restaurant (type) at 7:00 pm today (time/date) with friends (category of invitee), the application will consider such factors as which contacts could make it to the restaurant by 7:00 pm, which contacts have a preference for Italian food, which contacts the organizer has a "friend" relationship with, which contacts the organizer has invited (or chosen not to invite) in the past, which contacts have gone to dinner with the organizer in the past, etc. In another example, the organizer may have an extra ticket to a football game that he or she would like to sell. In that case, the event criteria may be the date, time, and location of the game, sale price of the ticket, and the names of the teams playing. The application may compare the criteria to the contact's location and calendar information (to determine availability) and favorite sports team, if known (to determine interest).

At 525, the application ranks the organizer's contacts according to the closeness of the match between the contact's information and the event criteria. For instance, the more criteria that a contact's information matches, the higher that contact's rank. Additionally, or alternatively, the application can assign weights to the event criteria and rank the contacts according to the number of matching criteria and/or the sum of the weights of the matching criteria. Accordingly, a contact matching higher weighted criteria may be ranked higher than a contact matching lower weighted criteria, even if the contact matching the higher weighted criteria has fewer matching criteria.

The organizer can also set the strength of his or her preferences for the event criteria. For example, the organizer may only moderately prefer that the time be 7:00 pm but strongly prefer that it be today. When comparing each contact's information to the event criteria, the application will assign a higher weight to the contact information matching higher weighted event criteria. In this example, since the organizer only moderately prefers that the dinner be at 7:00 pm, the application will weigh it less, and therefore, if a contact meets the other criteria but can't be at the restaurant by 7:00 pm, that contact may still receive a high ranking. These preferences are also useful in soliciting feedback from the invitees, as discussed below.

After ranking the contacts, the application displays them in a list sorted by rank, 530. At 535, the organizer can select which contacts to invite to the event. Alternatively, at 535, the application can recommend a group of possible invitees to the organizer consisting of the top ranked contacts. If the organizer has set a preferred, required, minimum, or maximum number of invitees, the application may only list an appropriate number of top-ranked invitees. The organizer can accept the recommended group, or make changes to it, such as adding or removing contacts. The organizer may also change certain criteria regarding the event if he or she does not like the ranking and/or recommended group.

At 540, the application or the organizer sends invitations to the selected group of invitees. The invitations may be short message service (SMS) messages, media messages, emails, voicemails, regular circuit-switched or packet-switched calls, etc. For example, the organizer could record a personalized voice message as a media message and provide the event details in the voice message, or could choose to send a text message or some other message with the details in addition to the voice message. Alternatively, the organizer could invite an invitee while speaking to him or her over a regular circuit-switched or packet-switched call.

The organizer can send the same invitation to each invitee via the application interface, or select different invitations for different invitees. The organizer can send all the invitations via the application interface or invite all the invitees without using the application by, for example, contacting them directly. Alternatively, the organizer can contact some invitees directly and use the application to contact the rest of the invitees. For instance, the organizer may invite family contacts by calling them, friends by texting them, and coworkers by sending them an email invitation through the application interface. In another example, if the organizer knows that certain invitees do not receive text messages, the organizer can contact those invitees by email or voicemail and contact everyone else by a text message invitation sent via the application.

Figure 6:
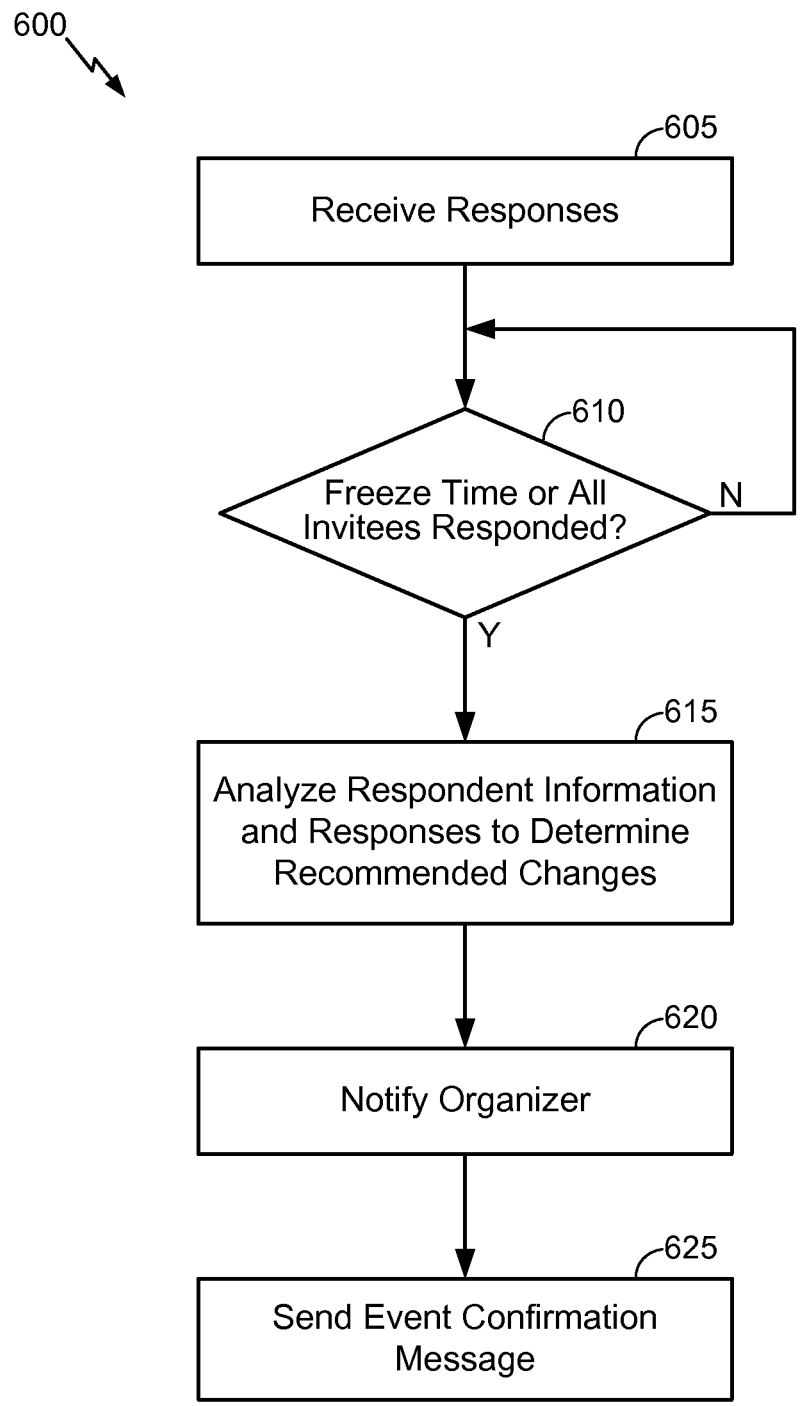
FIG. 6 illustrates an exemplary flowchart according to at least one embodiment of the invention.

FIG. 6 illustrates a flowchart 600 according to an embodiment of the invention, whereby the application recommends updates to the event details based on information about the respondents and their responses. At 605, the application receives responses from the respondents (i.e. responding invitees). As responses are received, they may be displayed in the application interface, permitting the organizer to browse through them individually. Additionally, the application may display a running tally of received responses under such headings as "yes" for acceptances, "no" for rejections, and "maybe" for conditional acceptances. The responses may be SMS or media messages, voicemails, emails, regular circuit-switched or packet-switched calls, etc. that the respondents compose themselves. The responses may contain more information than a simple "yes," "no," or "maybe," in which case the application can analyze the response to determine which it is.

In the case of an audio message, the application may recognize that it is from an invitee and convert it to text in order to determine whether it relates to the event. If it does, the application will save the text as a response. The received responses may also be messages that the respondents have sent through the interface of the same invitation application installed on their wireless devices. In the case of a circuit-switched or packet-switched call between the organizer and invitee, where the organizer invites the invitee during the call, the application can recognize when the invitation is spoken (by, for example, determining when the organizer speaks certain keywords associated with the event, such as date, time, place, etc.) and analyze the invitee's response to determine whether it can be classified as "yes," "no," or "maybe."

A response may be an acceptance, rejection, or conditional acceptance of the invitation. For example, a respondent may accept the invitation on condition that it can be changed to a different time, different location, different price, etc. A conditional response could also be an acceptance on condition that none of the event details are changed. A conditional response could also be a "maybe" response, where the respondent is not sure whether they can attend the event but want to send a response before the freeze time. Although conditional, a "maybe" response need not propose any changes to the event. A respondent has the option of sending the response to the organizer, a subset of the invitees, or all of the invitees. The respondent may choose the subset of invitees manually, or be provided with choices, such as invitees that have already responded, invitees in the respondent's contact list, etc.

At 610, the application waits until the freeze time has been reached or until all invitees have responded, whichever comes first. As discussed above, the freeze time may be an actual date and/or time or a certain number of responses or acceptances. The application can display responses received after the freeze time to the organizer, but it will not consider them for event planning purposes.

At 615, the application analyzes the attendees' (i.e. accepting and conditionally accepting respondents) present information, history, preferences, and responses to determine whether to recommend one or more updates to the event. The application analyzes the attendees' present information, history, and preferences to determine if certain event details should be changed to better fit the set of attendees. If so, the application can recommend particular changes to the event. For example, if more of the attendees are located closer to a different branch of the proposed Italian restaurant than not, the application can recommend changing the location to the closer branch.

The application analyzes any conditional responses to determine if a majority of the attendees proposed a change to a particular event detail. If so, the application can recommend changing that event detail as proposed. For example, if a majority of attendees proposed a different type of food, for instance Mexican, the application can recommend changing the venue to a Mexican restaurant near a majority of the attendees. In considering these potential changes, the application analyzes the attendees' present information, history, and preferences to ensure that the proposed changes are compatible with them, as in 520 of FIG. 5. For example, the application can consider whether an attendee has a history of rejecting invitations to Mexican restaurants, or rejecting invitations for events scheduled after the proposed time, or rejecting invitations for events outside a certain radius from the attendee's location, etc.

As an example, if the organizer sent an invitation to purchase an extra ticket at a certain price, the proposed change in a conditional response could be an offer greater than the sale price (e.g. a "best offer") rather than a simple acceptance. Alternatively, the organizer could optionally specify the lowest price he or she would be willing to accept and ask the invitees to conditionally respond with bids for the ticket. In analyzing the responses at 615, the application could determine the highest bidder and recommend that the organizer accept that bid or change the price to that bid.

The fewer details the organizer specified in the invitation, the more leeway the application will have to recommend changes to the event based the attendees' information and their responses. For example, if the invitation was simply to get together for dinner on a particular day, the application could consider the type of restaurants a majority of the attendees prefer, a central location to the majority of the attendees, a time the majority of the attendees are available, etc., and recommend a place, time, and location based on that information.

If, on the other hand, the organizer specified all or most of the details about the event, it may indicate a strong preference for that particular event, in which case the application will be less likely to recommend changes. For example, if the invitation was to attend the first showing of a particular movie, it is unlikely that the organizer would be interested in changing any of the details other than perhaps the location.

If the organizer specified a minimum or maximum number of attendees, then at 615, the application will determine whether these minimum and maximum numbers have been satisfied. If at least the minimum number of respondents or less than the maximum number of respondents accept (not counting conditional responses), the application may not consider the conditional responses. Rather, the application may only consider the accepting respondents present information, history, and preferences to determine whether to recommend updates to the event, as discussed above. If, however, there were a large number of conditional acceptances, the application may also consider the proposed changes in the responses, as discussed above.

If more than the maximum number of respondents accepts (not counting conditional responses), the application may recommend changes that would reduce the number of respondents that could accept, or simply notify the organizer so that he or she may change the event details. For example, if the organizer is selling a pair of tickets and sets a maximum of two acceptances, and five invitees accept, the application could recommend increasing the price for the ticket. Alternatively, once the maximum number of attendees is reached, the application may ignore further responses or send a message to the remaining invitees indicating that the maximum number has been reached.

At 620, the application notifies the organizer of any recommended change(s). The application may also display the list of respondents and their responses. At 625, the organizer can choose to accept the changes or leave the event criteria as is. The organizer may also choose to cancel the event. Whichever the organizer chooses, the application sends a confirmation message to the invitees notifying them of the final details for the event. The confirmation goes to all invitees so that if any change their mind, they remain informed of the details of the event. Alternatively, the organizer may choose to send the confirmation only to the respondents or only to the attendees. The confirmation message may be in the same or a different format as the initial invitation, e.g. an SMS or media message, voicemail, etc.

Sending a confirmation message after the invitation message is advantageous for a number of reasons, including that the organizer can use the invitation to solicit feedback about a proposed event then confirm that event based on the feedback. For example, an organizer may want to see a movie, but not care if it's one movie or another. The organizer can send an invitation with movie choices and a request that the invitees vote for the one they would like to attend. Upon receiving a majority vote, the organizer could then send a confirmation message including the details for the winning movie.

When sending the confirmation, the organizer may set a new freeze time to give the invitees an opportunity to reconsider the invitation based on the new details. Accordingly, the process could repeat iteratively until the organizer decides to send a final confirmation.

The final confirmation may be configured to add the event to the attendees' calendars. This may be accomplished by an embedded link in the confirmation message that the attendee clicks on. Alternatively, if the attendees have the application installed on their wireless devices, or have their wireless devices linked to their calendar, it may be done automatically.

Figure 7:
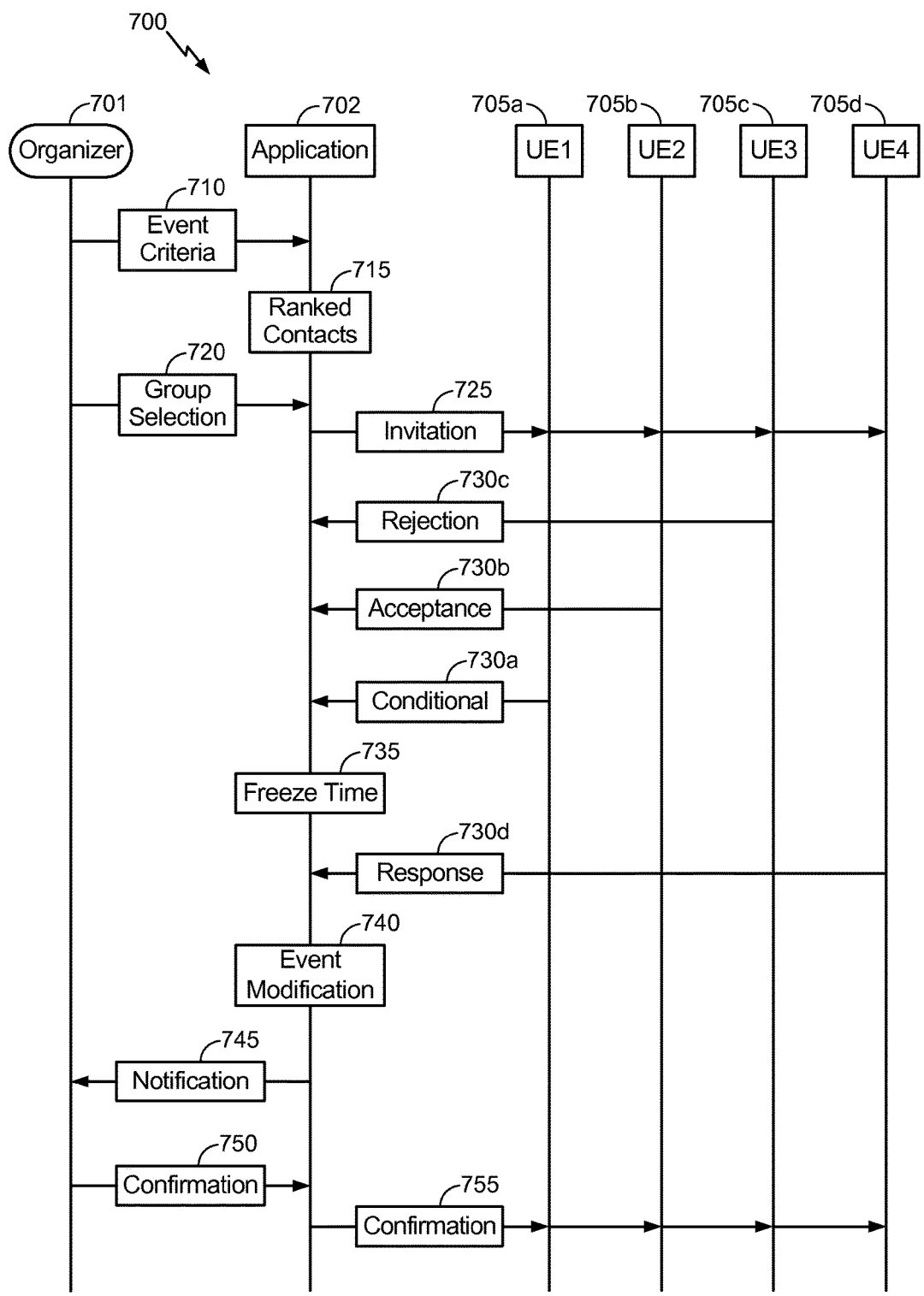
FIG. 7 illustrates an exemplary flow of at least one embodiment of the invention.

FIG. 7 illustrates an exemplary flow 700 of an embodiment of the invention. At 710, organizer 701 enters the event criteria into application 702. At 715, application 702 generates a ranked list of contacts as described above with reference to FIG. 5. At 720, the user selects a group of invitees from the ranked list of contacts or accepts the recommended list of invitees as discussed above with reference to FIG. 5. In the example illustrated in FIG. 7, UEs 705a-d are selected as the group of invitees. At 725, application 702 sends an invitation to UEs 705a-d. At 730a-c, application 702 receives responses from UEs 705a-c, respectively. Response 730a from UE 705a is a conditional acceptance, response 730b from UE 705b is an acceptance, and response 730c from UE 705c is a rejection. No response is received at this time from UE 705d. At 735, the freeze time passes. At 730d, UE 705d responds. Because this response is received after the freeze time, application 702 will not consider it in determining whether to recommend updates to the event details. At 740, application 702 recommends modifications to the event details based on the responses and the attendees' information, as discussed above with reference to FIG. 6. At 745, application 702 notifies organizer 701 of the recommended changes to the event. At 750, organizer 701 confirms (or rejects) the changes. At 755, application 702 sends the event confirmation message to UEs 705a-d, even though 705c rejected and 705d did not respond before the freeze time.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for creating a dynamic group of invitees for an impromptu event and updating the details of the event as necessary based on information about the respondents that accept the invitation. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for generating a group of invitees in a wireless communication system comprising:

receiving, by a wireless device, criteria for an event from an organizer of the event, wherein at least one criterion of the criteria is associated with a parameter indicating a strength of the organizer's preference for the at least one criterion;

analyzing, by the wireless device, contact information of each contact of a plurality of contacts of the organizer, the contact information including present information, history, or user preferences of the contact, wherein one or more of the user preferences of the contact are obtained from a conversation history between the contact and the organizer and/or social networking posts, blog posts, microblog posts, or any combination thereof, received at the wireless device;

comparing, by the wireless device, the criteria and the parameter to the contact information of each contact of the plurality of contacts;

assigning, by the wireless device, a recommendation ranking to each contact of the plurality of contacts based on the comparison of the criteria and the parameter to the contact information of each contact of the plurality of contacts;

displaying, by the wireless device, a subset of the plurality of contacts sorted according to the recommendation ranking;

receiving, by the wireless device, input from the organizer adding one or more contacts to the subset of the plurality of contacts or removing one or more contacts from the subset of the plurality of contacts to generate the group of invitees; and sending, by the wireless device over the wireless communication system, an invitation to the event to user devices of the group of invitees, the invitation including the criteria for the event.

2. The method of claim 1, further comprising:
recommending the subset of the plurality of contacts as the group of invitees.

3. The method of claim 1, further comprising:
receiving a selection of contacts from the subset of the plurality of contacts as the group of invitees.

4. The method of claim 1, wherein the invitation comprises a plurality of different types of invitations.

5. The method of claim 4, wherein the plurality of different types of invitations comprise one or more of a short message service message, a media message, an email, a voicemail, or a regular circuit-switched or packet-switched call.

6. The method of claim 1, wherein the event is one of a movie, dinner, sports activity, sporting event, sale offer, bid request, or meeting.

7. The method of claim 1, wherein the criteria is one or more of an event category, name, time, date, location, description, type, purpose, minimum number of invitees, maximum number of invitees, relationship of invitee, strength of the criteria, or freeze time.

8. The method of claim 7, wherein the freeze time is one of a time by which the group of invitees must respond to the invitation, a threshold number of invitees that must respond, a threshold number of invitees that must accept, or a threshold number of invitees that must accept or conditionally accept.

9. The method of claim 1, wherein the present information of the contact comprises one or more of a location, age, gender, relationship to the organizer, profession, current online status, or calendar status of the contact.

10. The method of claim 1, wherein the history of the contact comprises one or more of a number of times the organizer invited the contact to similar events, a number of times the organizer chose not to invite the contact when presented with the contact as a prospective invitee, a number of times the contact accepted an invitation, a number of times the contact has been to a location, or a number of times the organizer has called or messaged the contact.

11. The method of claim 1, wherein the user preferences of the contact are related to the criteria of the event.

12. The method of claim 1, wherein the user preferences of the contact comprise one or more of a type of food the contact prefers, a type of movie the contact prefers, whether the contact is a vegetarian, the contact's favorite sports team(s), or the contact's preferred means of contact.

13. The method of claim 1, wherein the comparing comprises:
retrieving the contact information of each contact of the plurality of contacts; and searching the contact information of each contact for keywords matching the criteria of the event.

14. The method of claim 1, wherein the assigning comprises:
assigning a weight to each criteria for the event;
aggregating weights of each criteria matching the contact information; and
assigning the recommendation ranking to each contact based on the aggregation of the weights for the contact information of each contact.

15. An apparatus for generating a group of invitees in a wireless communication system comprising:
a user interface configured to receive criteria for an event from an organizer of the event, wherein at least one criterion of the criteria is associated with a parameter indicating a strength of the organizer's preference for the at least one criterion;
a memory and a processor coupled to the memory configured to analyze contact information of each contact of a plurality of contacts of the organizer, the contact information including present information, history, or user preferences of the contact, wherein one or more of the user preferences of the contact are obtained from a conversation history between the contact and the organizer and/or social networking posts, blog posts, microblog posts, or any combination thereof, received at the wireless device, to compare the criteria and the parameter to the contact information of each contact of the plurality of contacts, and to assign a recommendation ranking to each contact of the plurality of contacts based on the comparison of the criteria and the parameter to the contact information of each contact of the plurality of contacts;
wherein the user interface is further configured to display a subset of the plurality of contacts sorted according to the recommendation ranking and to receive input from the organizer adding one or more contacts to the subset of the plurality of contacts or removing one or more contacts from the subset of the plurality of contacts to generate the group of invitees; and
a transmitter configured to send, over the wireless communication system, an invitation to the event to user devices of the group of invitees, the invitation including the criteria for the event.

16. The apparatus of claim 15, further comprising:
wherein the processor is further configured to recommend the subset of the plurality of contacts as the group of invitees.

17. The apparatus of claim 15, further comprising:
wherein the processor is further configured to receive a selection of contacts from the subset of the plurality of contacts as the group of invitees.

18. The apparatus of claim 15, wherein the invitation comprises a plurality of different types of invitations.

19. The apparatus of claim 18, wherein the plurality of different types of invitations comprise one or more of a short message service message, a media message, an email, a voicemail, or a regular circuit-switched or packet-switched call.

20. The apparatus of claim 15, wherein the event is one of a movie, dinner, sports activity, sporting event, sale offer, bid request, or meeting.

21. The apparatus of claim 15, wherein the criteria is one or more of an event category, name, time, date, location, description, type, purpose, minimum number of invitees, maximum number of invitees, relationship of invitee, strength of the criteria, or freeze time.

22. The apparatus of claim 21, wherein the freeze time is one of a time by which the group of invitees must respond to the invitation, a threshold number of invitees that must respond, a threshold number of invitees that must accept, or a threshold number of invitees that must accept or conditionally accept.

23. The apparatus of claim 15, wherein the present information of the contact comprises one or more of a location, age, gender, relationship to the organizer, profession, current online status, or calendar status of the contact.

24. The apparatus of claim 15, wherein the history of the contact comprises one or more of a number of times the organizer invited the contact to similar events, a number of times the organizer chose not to invite the contact when presented with the contact as a prospective invitee, a number of times the contact accepted an invitation, a number of times the contact has been to a location, or a number of times the organizer has called or messaged the contact.

25. The apparatus of claim 15, wherein the user preferences of the contact are related to the criteria of the event.

26. The apparatus of claim 15, wherein the user preferences of the contact comprise one or more of a type of food the contact prefers, a type of movie the contact prefers, whether the contact is a vegetarian, the contact's favorite sports team(s), or the contact's preferred means of contact.

27. The apparatus of claim 15, wherein the processor being configured to compare comprises the processor being configured to:
retrieve the contact information of each contact of the plurality of contacts; and
search the contact information of each contact for keywords matching the criteria of the event.

28. The apparatus of claim 15, wherein the processor being configured to assign comprises the processor being configured to:
assign a weight to each criteria for the event;
aggregate weights of each criteria matching the contact information; and
assign the recommendation ranking to each contact based on the aggregation of the weights for the contact information of each contact.

29. An apparatus for generating a group of invitees in a wireless communication system comprising:
a memory and a processor coupled to the memory configured to:
receive criteria for an event from an organizer of the event, wherein at least one criterion of the criteria is associated with a parameter indicating a strength of the organizer's preference for the at least one criterion;
analyze contact information of each contact of a plurality of contacts of the organizer, the contact information including present information, history, or user preferences of the contact, wherein one or more of the user preferences of the contact are obtained from a conversation history between the contact and the organizer and/or social networking posts, blog posts, microblog posts, or any combination thereof, received at the wireless device;
compare the criteria and the parameter to the contact information of each contact of the plurality of contacts;
assign a recommendation ranking to each contact of the plurality of contacts based on the comparison of the criteria and the parameter to the contact information of each contact of the plurality of contacts;
display a subset of the plurality of contacts sorted according to the recommendation ranking; and
receive input from the organizer adding one or more contacts to the subset of the plurality of contacts or removing one or more contacts from the subset of the plurality of contacts to generate the group of invitees; and
wherein a transmitter is configured to send, over the wireless communication system, an invitation to the event to user devices of the group of invitees, the invitation including the criteria for the event.

30. A non-transitory computer-readable medium for generating a group of invitees in a wireless communication system comprising:
at least one instruction to receive criteria for an event from an organizer of the event, wherein at least one criterion of the criteria is associated with a parameter indicating a strength of the organizer's preference for the at least one criterion;
at least one instruction to analyze contact information of each contact of a plurality of contacts of the organizer, the contact information including present information, history, or user preferences of the contact, wherein one or more of the user preferences of the contact are obtained from a conversation history between the contact and the organizer and/or social networking posts, blog posts, microblog posts, or any combination thereof, received at the wireless device;
at least one instruction to compare the criteria and the parameter to the contact information of each contact of the plurality of contacts;
at least one instruction to assign a recommendation ranking to each contact of the plurality of contacts based on the comparison of the criteria and the parameter to the contact information of each contact of the plurality of contacts;
at least one instruction to display a subset of the plurality of contacts sorted according to the recommendation ranking;
at least one instruction to receive input from the organizer adding one or more contacts to the subset of the plurality of contacts or removing one or more contacts from the subset of the plurality of contacts to generate the group of invitees; and
at least one instruction to send, by the wireless device over the wireless communication system, an invitation to the event to user devices of the group of invitees, the invitation including the criteria for the event.

31. The method of claim 1, wherein receiving the input from the organizer adding one or more contacts to the subset of the plurality of contacts or removing one or more contacts from the subset of the plurality of contacts comprises receiving input from the organizer removing one or more contacts from the subset of the plurality of contacts.

32. The method of claim 1, wherein the criteria includes a freeze time, and wherein the freeze time is one of a threshold number of invitees that must respond, a threshold number of invitees that must accept, or a threshold number of invitees that must accept or conditionally accept.

* * * * *